A. F. FRENCH.
Grain Binder

No. 19,687.  Patented March 23, 1858.

WITNESSES:  INVENTOR:

UNITED STATES PATENT OFFICE.

A. F. FRENCH, OF FRANKLIN, ASSIGNOR TO GEO. I. STANNARD, OF ST. ALBANS, VERMONT.

IMPROVED BINDING ATTACHMENT TO REAPERS.

Specification forming part of Letters Patent No. 19,687, dated March 23, 1858.

*To all whom it may concern:*

Be it known that I, AARON F. FRENCH, of Franklin, in the county of Franklin and State of Vermont, have invented a new and Improved Binding Attachment to be applied to Reapers; and I do hereby declare that the following is a full, clear, and exact description of the same, reference being had to the annexed drawings, making part of this specification, in which—

Figure 2:
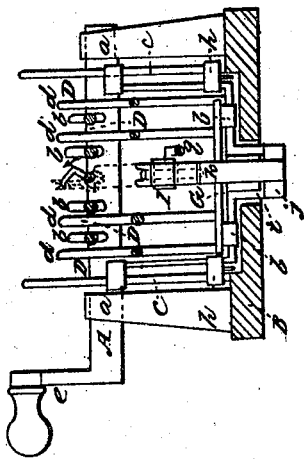
Figure 1:
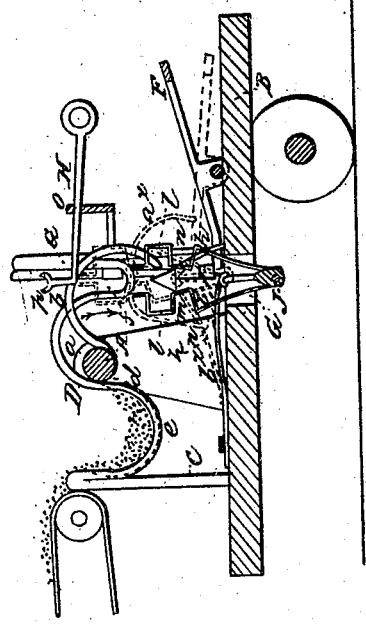
Figure 3:
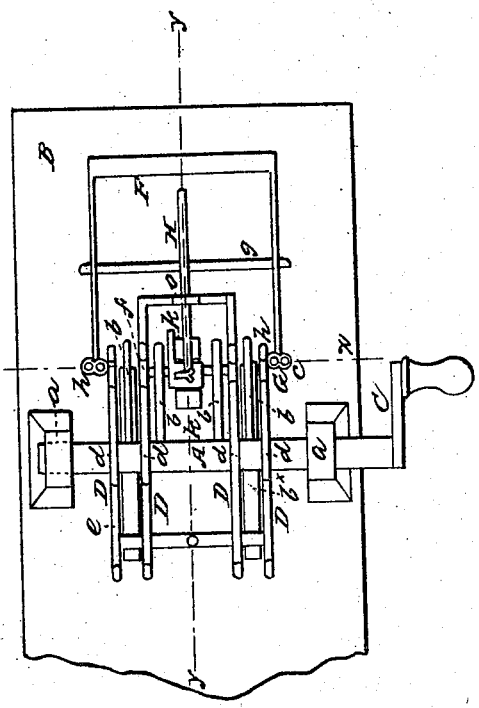

Figure 1 is a longitudinal vertical and central section of my improvement. Fig. 2 is a transverse vertical section of the same, taken in the line $x\ x$ of Fig. 1. Fig. 3 is a plan or top view of the same.

Similar letters of reference indicate corresponding parts in the several figures.

This invention consists in the employment or use of a revolving rake, stationary curved rods, band-holders, and a band-adjuster, arranged as hereinafter shown, whereby the grain may, by an attendant, be bound as rapidly as it is cut by the reaping-machine to which the device is attached.

To enable others skilled in the art to fully understand and construct my invention, I will now proceed to describe it, and the manner in which it is operated.

A represents a shaft, which is placed in suitable bearings $a\ a$, secured to a platform, B. This shaft has a crank, C, at one end, and has curved teeth $b$ attached to it, said teeth being of semicircular or an approximate form, as clearly shown in Fig. 1.

D represents curved and bent metal rods, which are attached to the platform B at such distances apart as to allow the teeth $b$ to pass between them. These rods are so bent as to form upright portions $c$ at each end, which serve as supports, the other part, $d$, being curved in horizontal S form, as clearly shown in Fig. 1, so that a receptacle, $e$, is obtained at one end to receive the grain from the platform of the reaper; and another receptacle, $f$, is formed at the opposite end to receive the grain for binding.

F is a treadle-frame attached to the platform B, the fulcrum being at $g$. The inner end of this frame is connected to a bar, G, the ends of which have eyes or guides $h$ attached, to which eyes are fitted and allowed to work loosely on the vertical portions $c$, at the outer ends of the rods D. The central portion of the bar G is bent downward at right angles with the other part, forming a jog or loop, as shown at $i$, in Figs. 1 and 2; and a bar, $j$, is attached to the bottom of the loop, said bar having two elastic and bent plates, $k\ k$, attached to it at opposite sides. These plates $k$ should be formed of steel properly tempered. Their upper ends are notched to receive the band which passes around the gavel, and, when properly secured, forms the sheaf. The upper part of the plates $k$, just below their ends, are bent outward, as shown at $l\ l$, and they are then bent inward, as shown at $m\ m$, and again bent outward, as shown at $n\ n$. See Fig. 1.

H is a rod or bar, which is fitted in a bearing, $o$, attached to the two central rods, the rod H being allowed to slide freely back and forth, and also turn in said bearing. The inner end of said rod or bar is hooked or bent at right angles with the other part, and is notched to form a claw, $p$, as shown in Fig. 3.

I is a triangular bar, which is placed between the two strips $k\ k$, and is supported by a rod, $g$.

The operation is as follows: The platform B is so connected with a reaper as to receive the grain therefrom by means of an endless apron, the grain being deposited in the receptacle $e$. When a sufficient quantity of grain is deposited therein, the attendant turns the shaft A one-half of a revolution, and the grain in $e$ is carried around by the teeth $b$ of the shaft A, and is deposited in the receptacle $f$. The attendant, previous to the turning of the shaft A, twists a band of straw, $a^x$, and places it in the notches at the upper ends of the plates $k\ k$; and when the grain is turned into the receptacle $f$ the band $a^x$ and the strips $k\ k$ are just below it. The attendant then depresses the outer end of the lever-frame F, and the strips $k\ k$ are elevated; and as they rise they are distended by the bar I, and the upper bent portions of the strips will encompass the grain in $f$, the strips closing as their upper ends pass above the grain, and consequently clasping it, and bring the two ends of the band $a^x$ in contact, as shown clearly in Fig. 1 in blue color.

The operator then twists slightly the ends of the band $a^x$, and turns the rod or bar H so that the claw $p$ will tuck the ends of the band underneath its other portion which encompasses the grain $f$. The bar G has springs $b^\times$ $b^\times$ connected with it, said springs having a tendency to keep the strips $k\,k$ depressed, and consequently, when the foot is withdrawn from the lever-frame, drawing down the strips $k$. When the straw in $f$ is bound, the strips $k$ are alowed to descend, the bound grain is withdrawn from $f$, and the revolution of shaft A completed, so as to again supply the receptacle $f$ from the receptacle $e$, the grain in $e$ accumulating in sufficient quantity to form a sheaf while the quantity that was previously conveyed from it is being bound.

This invention has been practically tested, and operates well. It may be constructed and applied to reapers at a small cost, and will greatly facilitate the harvesting of grain.

Having thus described my invention, what I claim as new, and desire to secure by Letters Patent, is—

The revolving rake formed of the curved teeth $b$ attached to the shaft A, the rods D, curved as shown, so as to form the receptacles $e\,f$, and the elastic strips $k\,k$, connected with the lever-frame F, the above parts being combined and arranged to operate substantially as shown, with or without the rod or bar, for the purpose set forth.

AARON F. FRENCH.

Witnesses:
A. J. SAMSON,
WM. BRIDGES.